US012637572B2

(12) United States Patent
Ying

(10) Patent No.: US 12,637,572 B2
(45) Date of Patent: May 26, 2026

(54) COMPOSITION FOR DEPOSITING AN ALKANETHIOL MONOMOLECULAR LAYER ON A METALLIC SURFACE AND RELATED METHODS

(71) Applicant: Nano Mint Technologies LLC, Henderson, NV (US)

(72) Inventor: Tsineng Ying, Myrtle Beach, FL (US)

(73) Assignee: Nano Mint Technologies LLC, Henderson, NV (US)

( * ) Notice: Subject to any disclaimer, the term of this patent is extended or adjusted under 35 U.S.C. 154(b) by 0 days.

(21) Appl. No.: 19/239,572

(22) Filed: Jun. 16, 2025

(65) Prior Publication Data

US 2025/0368834 A1 Dec. 4, 2025

Related U.S. Application Data

(63) Continuation-in-part of application No. PCT/US2024/031790, filed on May 30, 2024.

(Continued)

(30) Foreign Application Priority Data

Jan. 3, 2024 (CN) .......................... 202410009803.7

(51) Int. Cl.
*C09D 5/00* (2006.01)
*B05D 1/18* (2006.01)
(Continued)

(52) U.S. Cl.
CPC ............. *C09D 5/086* (2013.01); *B05D 1/185* (2013.01); *C09D 5/14* (2013.01); *C09D 7/45* (2018.01); *C09D 7/63* (2018.01)

(58) Field of Classification Search
CPC . C09D 5/086; C09D 5/14; C09D 7/45; C09D 7/63; B05D 1/185
See application file for complete search history.

(56) References Cited

U.S. PATENT DOCUMENTS

| | | | |
|---|---|---|---|
| 2,882,134 A | 4/1959 | Spring et al. | |
| 7,972,655 B2 * | 7/2011 | Abys ...................... | H05K 3/282 |
| | | | 427/430.1 |

(Continued)

FOREIGN PATENT DOCUMENTS

| | | | |
|---|---|---|---|
| WO | 9948682 A1 | 9/1999 | |
| WO | WO-2017220790 A1 * | 12/2017 | .............. C23F 11/12 |

OTHER PUBLICATIONS

Limura et al. Direct thioesterification from carboxylic acids and thiols catalyzed by a Broensted acid. ChemComm. pp. 94-95 ( Year: 2002).*

(Continued)

*Primary Examiner* — Amber R Orlando
*Assistant Examiner* — Anastasia A. Kuvayskaya
(74) *Attorney, Agent, or Firm* — Connie R. Masters

(57) ABSTRACT

A composition and methods for depositing a monomolecular layer of alkanethiol on a metallic surface in under 10 minutes are provided. The monomolecular layer of alkanethiol is applied using economical and reliable methods, such as by burnishing or ultrasonic bathing. The composition removes extra layers of alkanethiol to allow a single, even self-assembled monomolecular layer to form on the metallic surface, which enhances the tarnish-resistance of the surface and lubricates the surface.

26 Claims, 7 Drawing Sheets

Related U.S. Application Data

(60) Provisional application No. 63/504,960, filed on May 30, 2023.

(51) Int. Cl.

| | | |
|---|---|---|
| *C09D 5/08* | (2006.01) | |
| *C09D 5/14* | (2006.01) | |
| *C09D 7/45* | (2018.01) | |
| *C09D 7/63* | (2018.01) | |

(56) References Cited

U.S. PATENT DOCUMENTS

| | | | |
|---|---|---|---|
| 2013/0224515 A1* | 8/2013 | Foyet | C25D 7/00 |
| | | | 428/673 |
| 2020/0305435 A1 | 10/2020 | McGeechan et al. | |

OTHER PUBLICATIONS

Lienhard et al. Thiol addition to the carbonyl group. Equilibria and kinetics. Journal of the American Chemical Society, pp. 3982-3995 (Year: 1966).*

Ying et al. An advanced anti-tarnish process for4 silver coins and silverware—monomolecular octanethiol protective film. Tribology Transactions. vol. 645, No. 2, pp. 341-349 (Year: 2021).*

Ying et al. Nanotribology Application in the coining industry (II)—Optimization of lubricant film formation on blanks. Tribology Transactions, 56, pp. 749-758 (Year: 2013).*

USAD-33662_ CARBOQUAT H_Product Information retrieved from https://www.atamanchemicals.com/upload/katalog/36.pdf on Oct. 31, 2025 (Year: 2009).*

Abd-El-Nabey, B. A. Effect of Tween-80 Surfactant on the Corrosion Resistance of Zn-Phosphated Stee.

WIPO: International Search Report dated Aug. 28, 2024 for International Application No. PCT/US2024/031790 filed on May 30, 2024.

WIPO: Written Opinion of International Search Authority dated Aug. 28, 2024 for International Application No. PCT/US2024/031790 filed on May 30, 2024.

* cited by examiner

Coin's Color Change Before and After Sulfurization

Route 66
Round

Chinese Panda

N. Zealand
Turtle

Australia
Kangaroo

Poland
Germania

US Eagle

US Quarter

Royal Mint
Britannia

Reflectivity (%)

100.0
95.0
90.0
85.0
80.0
75.0
70.0
65.0
60.0
55.0
50.0

Time

25

25

COMPOSITION FOR DEPOSITING AN ALKANETHIOL MONOMOLECULAR LAYER ON A METALLIC SURFACE AND RELATED METHODS

CROSS-REFERENCE TO RELATED APPLICATIONS

The present application is a continuation-in-part application claiming priority to co-pending PCT Application No. PCT/US24/317 that was filed on May 30, 2024, which claimed priority to U.S. Provisional Application No. 63/504,960 that was filed on May 30, 2023, which are incorporated herein in their entirety.

FIELD OF INVENTION

This invention relates generally to a composition and methods for inhibiting corrosion of metallic material by applying sulfur-containing organic inhibitors to a metal surface in danger of corrosion.

BACKGROUND OF THE INVENTION

Tarnishing or discoloration of silver surfaces is a long-known but unsolved issue. Beautiful metal articles, such as coins, jewelry, and flatware, are easily and quickly tarnished if they are exposed to the normal atmospheric environment. Even if silver and gold articles are faithfully stored in a controlled environment tarnishing still occurs over time. For example, collectible silver coins are typically stored in plastic capsules to reduce tarnishing, yet after a few years the edges of coins begin to display a brown color. Even museum artifacts that are stored in a controlled environment will discolor as the years pass.

The tarnishing or staining of silver surfaces is caused by water, humidity, and particularly by sulfur in the environment. Sulfurization occurs because the silver easily reacts with $H_2S$ in the air to form silver sulfide. Even a very low concentration of $H_2S$ in the air can cause the silver surface to tarnish. Oxidation on the surface can also be observed as dark discoloration or stain.

Tarnish or corrosion on gold surfaces, which often displays as small reddish dots, is a related problem, because the tarnish is known to be mainly silver sulfide. Silver sulfide can form because even the purest gold retains a tiny proportion of residual microscopic particles of silver embedded within the gold metal. Research has shown that even though the gold metal has a purity of 99.99% or higher, a tiny quantity of silver resides on the gold surface. It is this residual silver, which, over time, corrodes to become visible red dots of silver tarnish on the gold surface. These red dots cause gold buyers to suspect the purity of the material. Solving the problem of silver tarnishing remediates the gold tarnishing problem.

The coining industry has recently addressed another issue related to the tarnish problems, but it has only been addressed on cupronickel coins. For over a decade, the coining industry has been treating copper alloy coins with a benzotriazole (BTA) composition to form an anti-tarnish film on the cupronickel surface. The cupronickel anti-tarnish film that is created on the coin surface not only has anti-tarnish properties, but it also serves as a lubricant between the coin and the die. The use of this cupronickel anti-tarnish BTA film, with its enhanced lubrication properties, has saved millions of dollars per year in the cupronickel coin industry. Though the anti-tarnish problem for cupronickel has been resolved by applying the BTA film, BTA does not react with silver or gold. Thus, the tarnishing of silver or gold coins (or other silver or gold articles, or other metal surfaces with residual silver) and the lack of a suitable lubricant for non-cupronickel coins have remained problems.

In an attempt to address the problem of tarnish on silver (and the tarnish of silver embedded within or on the surface of pure gold), in recent years many chemicals have been screened to assess their anti-tarnish properties and to evaluate their bonding strength to silver surfaces. Alkanethiols were found to form an alkanethiol film that bonded strongly with silver surfaces in the laboratory and covered the silver surface, to a degree, to block attack by corrosive molecules. Alkanethiols (or alkyl mercaptans) are thiols of the structure R—SH having a hydrophobic alkyl chain (R) attached to a sulfhydryl group (SH).

It is currently understood that the sulfhydryl group (SH) of the alkanethiol has an affinity for silver and serves as a surface anchor. The alkane chain tail of the alkanethiol molecule extends outwardly from the surface anchor, with the alkane chain tails of adjacent molecules aligning, to a degree, with one another. The force that promotes the ordering of this self-assembly is the hydrophobic, van der Waals interactions between the carbons of the alkane chains. In a well-ordered alkanethiol film, this interaction causes the alkane chains to pack tightly and to tilt approximately 30 degrees to maximize the interaction between the chain tails and to lower the overall surface energy. It is believed that in the alkanethiol film created, the hydrophobic interactions between the chains overcome the rotational degrees of freedom of the molecules.

The alkanethiol films created by currently known formulations and methods are often termed "self-assembled monolayers (SAM)," but it has been determined that the film coating produced by conventional means is not truly a monolayer, but is laid down, at least partially, in multiple layers of alkanethiols, which creates an uneven film surface. This film is not consistently an even, single layer or monolayer. When multiple layers accumulate, a dark stain will appear. This dark stain is not only unsightly, but it also produces problems in coin stamping because the dark stain can transfer to the coining dies, which causes unwanted results. The multiple layers of alkanethiol also cause wearing of the die. Though termed "layers" of alkanethiols, the term "layers" may include actual layers, irregular clusters, or other unwanted gatherings of alkanethiols that are not part of the base single layer of alkanethiol film.

Testing has shown that when the alkanethiol is introduced to a silver surface, an initial poorly ordered stage of an alkanethiol film is formed quickly. It is far from well-ordered but instead has many awkward defects and areas of multiple layers, which are instigated by van der Waals interactions between the carbons of the alkane chains. After a few days to weeks of exposure, the initially poorly ordered alkanethiol film was found in testing to typically be able to self-assemble to become a somewhat well-ordered film. However, even with time, the current anti-tarnish formulations and methods produce a film which has areas of monolayer and areas of irregularities and/or clusters of alkanethiol molecules or layers of alkanethiol molecules. So, the conventionally produced alkanethiol film is not a true single layer or monolayer, but is more like skin that is mostly smooth, but that has warts and wrinkles distributed here and there. These clusters of alkanethiol molecules, over time, result in black (and/or brown) tarnished spots on the gold or silver article.

Therefore, the known compositions and methods for applying an alkanethiol film to the silver surface do not create a substantially well-ordered, single layer film that can tightly cover the surface, which is needed to prevent tarnish over the long term. Using currently known methods, although at first the surface does not tarnish, as time passes, black spots gradually appear. When analyzed, a high sulfur concentration was detected in the black spots, which were determined to be substantially silver sulfate (formed by the multiple layers or clusters of alkanethiol on the surface). This points to the fact that, using currently known formulations and methods, an inferior alkanethiol film that is not a single layer is produced. Additionally, current formulations and methods require many days to create an alkanethiol film. In most research laboratories, it takes a number of days after the samples are immersed in a sulfur-containing organic tarnish inhibitor solution to generate an alkanethiol film covering the whole surface. For use in consumer products and for use in commercial applications, the alkanethiol film needs to be applied in a much shorter amount of time.

Therefore, though alkanethiol films have been tested as an anti-tarnish treatment for silver surfaces with some degree of success, some key issues have not been solved, so the current use of self-assembled alkanethiol films is quite limited. Using conventional methods and treatment solutions, it has proved difficult to generate a thiol film on a silver or gold surface that is a true monolayer, and a poorly formed, defective monolayer does not meet the needs of commercial or consumer usage. It would be advantageous to be able to create a closely packed well-ordered alkanethiol monolayer of an even, substantially single-layer thickness. The protective film needs to be closely packed and single-layered to impede corrosive constituents and to fulfill its anti-tarnish function over time. A well-ordered single layer is also required to efficiently fulfill the lubrication function during coining to achieve a longer die life, to minimize blackening of the die, and to maintain a high coin surface quality. Additionally, a fully hydrophobic outer surface is needed so the coin blank or coins can shed rinse water to avoid forming water stains on their surfaces. Another problem is that the known formulations and methods form an alkanethiol film too slowly for commercial applications and undesirably slowly for consumer applications.

Accordingly, there is a need for an anti-tarnish composition that can be used to create an aqueous alkanethiol solution into which the article with a metal surface can be immersed to deposit an even single-layered, alkanethiol monolayer on the surface to provide long-lasting anti-tarnish and/or lubrication properties. Additionally, there is a need for methods of application of the alkanethiol, for creation of the aqueous alkanethiol solution, and for creation of a treated metallic article to which the anti-tarnish treatment can be applied quickly and efficiently in line with commercial manufacturing times for production of metallic objects, and yet in which the anti-tarnish composition forms a well-ordered monolayer of a substantially even thickness in which defects and areas of alkanethiol clusters and/or multiple layers are minimized.

SUMMARY OF THE INVENTION

The present invention is directed to an anti-tarnish composition in an aqueous solution form, which is used for depositing an alkanethiol monomolecular layer on a metallic surface and is also directed to methods for depositing the alkanethiol, for creating the aqueous alkanethiol solution, and for creating metallic articles treated with the anti-tarnish composition. In the present invention, the anti-tarnish alkanethiol film is applied in a short number of minutes (from under 1 minute to ten minutes) and is applied in an even, well-ordered monolayer. This short time frame accommodates production times in commercial facilities and facilitates usage by consumers. To create the monomolecular thiol layer, the inventive composition and methods act to remove any extra layers or clumps of alkanethiol that may have collected on the base alkanethiol monolayer. The self-assembled alkanethiol monomolecular layer that remains after removal of non-monolayer thiol molecules serves to reduce tarnishing of the metallic surface and, particularly in the coining industry, further serves as a lubricant between a die and the surface.

The anti-tarnish composition comprises an alkanethiol, a water-soluble emulsifier, an extra layer remover, and water. The extra layer remover comprises a carboxylic acid or a salt thereof, and it preferably comprises a tartaric acid or a salt thereof, in an amount that is effective to remove—in under ten minutes—extra molecules of the alkanethiol beyond a tightly packed base monomolecular layer of alkanethiol. Though tartaric acid can also serve as an emulsifier, an additional emulsifier is preferably added. Most preferably, the emulsifier comprises polysorbate 80. In a preferred aspect of the invention, an anti-microbial agent may be added to the anti-tarnish composition, which allows longer storage and/or usage times. In another aspect of the invention, a surfactant may additionally be added. The anti-tarnish composition comprises an aqueous alkanethiol solution. The alkanethiol is applied by burnishing or by ultrasonic bathing of the metal article in the aqueous alkanethiol solution. Due to the selected components of the inventive anti-tarnish composition and to the inventive methods used, a well-ordered monomolecular layer is efficiently ordered on the surface with extra thiol layers removed in a very short time, such as in from under one minute to ten minutes. Since conventional compositions and methods require hours or days to deposit an alkanethiol film, and since the inventive composition and methods require merely minutes to deposit an improved film, the inventive composition and methods solve the time problem currently experienced in commercial production facilities.

Though the alkanethiol composition (applied in the form of an aqueous alkanethiol solution) is herein particularly described for application to surfaces of silver and alloys thereof, it may also be used on other metal surfaces. The inventive alkanethiol composition can be applied to gold (and other metals) to both resolve the problem of the tarnishing of the residual silver and to provide lubrication for stamping or for other processes that may be used in manufacturing the metallic article. For example, gold surfaces can be treated so that the tiny portion of residual silver on its surface will not form the visible red dots of silver tarnish. Other metals may also have residual silver. Therefore, the inventive composition and treatment provides advantages in treating not only silver, but also gold and other metals with residual silver.

The anti-tarnish treatment may be used before or after creation of the metallic article. For example, tests were performed in a coin minting facility in which the anti-tarnish treatment was carried out before the stamping of a coin, after the stamping of a coin, and both before and after the stamping. Applying the treatment before stamping advantageously increases the lubrication and reduces the blackening of the die surface in addition to adding tarnish resistance. Applying the treatment after stamping provides tarnish resistance of the newly stamped metal surface. Applying the treatment before and after stamping provides both benefits, including improving the tarnish resistance beyond the tarnish resistance achieved by the before-stamping application alone.

In an aspect of the invention, the alkanethiol comprises hexadecanethiol.

In another aspect of the invention, the alkanethiol comprises octadecanethiol.

In a further aspect of the invention, the alkanethiol comprises a mixture of hexadecanethiol and octadecanethiol.

In an aspect of the invention, the emulsifier comprises polysorbate 80.

In a further aspect of the invention, the emulsifier comprises polyethylene glycol derivative (such as sold as TRITON X-100 under the brand name TRITON).

In another aspect of the invention, the emulsifier comprises a water-soluble nonionic surfactant.

In an aspect of the invention, the extra layer remover comprises a tartaric acid or a salt thereof.

In an additional aspect of the invention, the extra layer remover comprises tartaric acid.

In a further aspect of the invention, the extra layer remover comprises potassium tartrate.

In an aspect of the invention, the alkanethiol composition further includes an antimicrobial agent.

In an additional aspect of the invention, the antimicrobial agent comprises didecyl dimethyl ammonium bicarbonate and/or didecyl dimethyl ammonium carbonate, which is sold under the brand name of CARBOSHIELD 1000.

In an aspect of the invention, the method of treatment includes bathing the metallic object to be treated in an ultrasonic water bath.

In another aspect of the invention, the method of treatment includes bathing the metallic object to be treated in an ultrasonic water bath having two wave generators.

In an additional aspect of the invention, the method of treatment includes bathing the metallic object to be treated in an ultrasonic water bath having two wave generators operating at different frequencies.

In one aspect of the invention the ultrasonic bath treatment time is under 5 minutes.

In a further aspect of the invention, the ultrasonic bath time is 1 minute.

In an additional aspect of the invention, the ultrasonic bath time is between under 1 minute and 5 minutes.

In another aspect of the invention the ultrasonic bath time is under 10 minutes.

In a further aspect of the invention, a monomolecular layer is applied in a portable household ultrasonic cleaning machine.

In an additional aspect of the invention, the method of treatment includes bathing the metallic object to be treated, but not in an ultrasonic bath, which increases the time required, but may be suitable for some applications, such as household applications.

In another aspect of the invention, a monomolecular layer is applied onto the surface of a metallic object by a burnishing process in a burnishing machine using stainless steel media.

In an additional aspect of the invention, a monomolecular layer is applied on coin blanks by a burnishing process by burnishing with stainless steel media.

In an aspect of the invention, the anti-tarnish composition is applied before the stamping of a coin.

In another aspect of the invention, the anti-tarnish composition is applied after the stamping of a coin.

In an additional aspect of the invention, the anti-tarnish composition is applied both before and after stamping of a coin.

In a further aspect of the invention, the anti-tarnish composition is applied as a treatment on the surface of a metallic article after it is formed or shaped.

In a further aspect of the invention, a method for depositing an alkanethiol monomolecular layer on a metallic surface includes an environmental sulfurization test to evaluate the anti-tarnish properties.

In another aspect of the invention, a method for depositing an alkanethiol monomolecular layer on a metallic surface includes an accelerated sulfurization test to evaluate the anti-tarnish properties.

The object of the invention is to provide a composition for depositing an alkanethiol monomolecular layer onto a metal surface for tarnish resistance and/or lubrication in under ten minutes of exposure time and to provide methods related to the same, which give an improved performance over the above-described prior art systems and methods.

These and other objects, features, and advantages of the present invention will become more readily apparent from the attached drawings and from the detailed description of the preferred embodiments which follow.

BRIEF DESCRIPTION OF DRAWINGS

The preferred embodiments of the invention will hereinafter be described in conjunction with the appended drawings, provided to illustrate and not to limit the invention, where like designations denote like elements.

Like reference numerals refer to like parts throughout the several views of the drawings.

DETAILED DESCRIPTION OF THE INVENTION

Figure 1:
FIG. 1 is a top view of a reverse side of a 1993 US Mint Walking Liberty 1 oz silver coin before treatment using an aqueous solution of the anti-tarnish composition of the present invention.

Shown throughout the figures, the present invention is directed toward an anti-tarnish alkanethiol composition comprising an aqueous alkanethiol solution 10 that is used to deposit, in under ten minutes, an alkanethiol monomolecular layer onto a metal surface 25 (particularly silver or gold surface) of an object 20 to be treated. It is further directed to methods related to creating the aqueous alkanethiol solution 10, to applying the aqueous alkanethiol solution 10 to form a self-assembled monomolecular alkanethiol layer on the surface 25, to manufacture a tarnish-resistant article 20 having a metallic surface 25, and to test, via an accelerated sulfurization test, the anti-tarnish and lubricant properties of the metallic article 20 after treatment of the article 20 with the alkanethiol solution 10.

The monomolecular alkanethiol layer created by using the anti-tarnish composition (applied in the form of the aqueous alkanethiol solution 10) has been proven to be effective in minimizing the long-term effects of tarnishing and staining on gold and silver. The layer has been shown to be stable and reliable. It has a low surface tension with a contact angle greater than 90 degrees. Advantageously, it can be applied to a metal surface in a few minutes.

The anti-tarnish alkanethiol composition has many favorable characteristics for use in the coining industry and for consumer use. It is safe for industry workers and for home users. No special ventilation is required during usage. It is effectively applied, preferably using either of two methods, ultrasonic immersion and burnishing (mass finishing). And it can be safely and easily discarded at the end of its useful life.

The anti-tarnish alkanethiol solution 10 may be used to apply an alkanethiol monomolecular layer to the metallic surface 25 of an article 20 before, after, or before and after forming the metallic article; or the alkanethiol monomolecular layer may be applied to the surface of an article created months, years, or centuries ago, such as jewelry, silverware, or museum artifacts. Though new articles are often treated, and, in this case, pre-cleaning or tarnish removal may not be needed or wanted, the article 20 to which the alkanethiol monomolecular layer is to be applied may optionally be cleaned before application. In an example, an old, tarnished silver bowl could be pre-cleaned to achieve a tarnish-free surface and then treated with the alkanethiol solution 10 to establish an alkanethiol monomolecular layer to prevent future tarnish. However, collectors sometimes prefer a patina developed over a period of time (such as a light discoloration around the edges of a coin or silver tray to suggest to the viewer that the article is antique), so, optionally, an article 20 with a light patina may be treated to halt the tarnishing at an aesthetically pleasing state of tarnish and to prevent the development of a greater degree of tarnishing that would not be appealing.

The inventive composition and methods are suitable for improving the tarnish resistance of any of a variety of metallic articles 20 formed of silver or having a silver component or a silver residue, though in the exemplary discussion herein, the application of the monomolecular layer and the related methods are specifically discussed in relation to its application to silver and gold coins, and particularly silver coins. However, by using the disclosed inventive anti-tarnish composition incorporated into the aqueous alkanethiol solution 10, new or older articles 20 of other shapes and types may also be advantageously treated. For example, the inventive composition and methods are suitable and useful for individuals who may have new or antique silver articles that are tarnished and would benefit from tarnish removal along with the application of an anti-tarnish monomolecular layer. Further, the inventive composition and methods disclosed herein are advantageously usable by restorers of museum artifacts that have a tarnished metallic surface to remove tarnish and to apply an anti-tarnish monomolecular layer to prevent or minimize future tarnish or discoloration.

The alkanethiol of the inventive tarnish retarding composition has the general formula R—SH, where SH is a sulfhydryl group and where R is an alkyl radical having from ten through twenty carbon atoms forming a hydrophobic alkyl chain. In one embodiment of the invention, the alkanethiol comprises octadecanethiol. In another embodiment of the invention, the alkanethiol comprises hexadecanethiol. In an additional embodiment, a mixture of hexadecanethiol and octadecanethiol is used. In further embodiments, other alkanethiols are used and are within the scope of the invention.

The inventive anti-tarnish composition comprises an alkanethiol, an emulsifier, an extra layer remover, and water, preferably deionized water, (and, optionally, other components), which form the aqueous alkanethiol solution 10.

In one aspect of the invention, the aqueous alkanethiol solution 10 is to be used to provide a lubricating and tarnish resisting coating to coin blanks. In this aspect, it may be placed in a burnishing machine and the coin blanks may be rotated and burnished with stainless steel media.

In another aspect of the invention the aqueous alkanethiol solution 10 is disposed within the tank 13 of an ultrasonic water bath 12. In this aspect of the invention, the metallic article 20 or articles to be treated is/are supported and is/are bathed in the aqueous alkanethiol solution 10 (into which the alkanethiol anti-tarnish composition has been mixed).

In both the burnishing and ultrasonic application methods, the purpose is to increase the collision between the fluid molecules and the metallic surface, which enhances the chemical reaction rate. It is a dynamic process as some material is removed from the surface while other molecules are adsorbed onto the surface, depending on the properties of the chemicals involved. Using either the burnishing or ultrasonic application methods, a self-assembled monomolecular layer of alkanethiol is deposited in a period of time measured in minutes as opposed to the days of time required by the conventional processes. Upon immersion in the aqueous alkanethiol solution 10, the sulfur of the sulfhydryl group complexes with the silver atoms at the surface of the article being treated, and the large organic portion of the alkanethiol molecule forms a shield over the metal surface to protect it from atmospheric contaminants and to provide a lubricating effect. To achieve a substantially even monomolecular layer quickly, the extra layer remover removes molecules of alkanethiol that are layered upon, clustered upon, or extend beyond a well-ordered base monomolecular layer of the alkanethiol. This effect of the extra layer remover allows an alkanethiol monomolecular layer with a thickness of under 100 nanometers to be deposited. In an aspect of the invention, the alkanethiol monomolecular layer has a thickness of between 20 and 100 nanometers. In another aspect of the invention, the alkanethiol monomolecular layer has a thickness of less than 60 nanometers. In one aspect of the invention, the alkanethiol monomolecular layer is deposited in an even single layer having a thickness of 40 to 60 nanometers.

In addition to the alkanethiol, emulsifier, and extra layer remover, the anti-tarnish composition may include other components that are added to the composition to accomplish one or more of the following benefits: to assist in the removal of tarnish from the surface, to further aid in emulsification, to improve the viscosity of the fluid in the tank 13, to provide a stable product, to prevent growth of microbes in the solution 10, and/or to further assist in removing extra molecules and layers of the alkanethiol. For example, in addition to the alkanethiol, emulsifier, and extra layer remover, the composition may include any one or more of the following: one or more anti-microbial agents, additional emulsifier(s), surfactant(s), rheology modifier(s), liquid diluent(s), and/or an additional extra layer remover(s). Optionally, the anti-tarnish composition may further comprise a coloring agent and/or an odorant.

The surfactant may be a nonionic surfactant and/or a cationic surfactant, but is preferably a non-ionic surfactant, such as glycerol monostearate.

The anti-microbial agent may be any standard anti-microbial compound. In a preferred aspect of the invention, an anti-microbial agent sold under the brand name of CARBOSHIELD 1000 is used. The active ingredients of CARBOSHIELD 1000 are didecyl dimethyl ammonium bicarbonate and/or didecyl dimethyl ammonium carbonate. The CARBOSHIELD 1000 component, in addition to its anti-microbial properties, also acts as a cationic surfactant and serves to inhibit corrosion. Because around 99% of the chemicals in the aqueous alkanethiol solution 10 may be food grade, as time passes fungus will grow in the aqueous alkanethiol solution 10, which can cause the aqueous alkanethiol solution 10 to agglomerate (like the fat on the surface of a soup). By using an anti-microbial agent, the aqueous alkanethiol solution 10 can be stored for a substantial length of time (which provides an advantage to industrial facilities and to consumer sales in which the alkanethiol composition in liquid form may spend time on the retail shelf) and can be used for a longer time in the ultrasonic bath 12 or burnishing tank.

The emulsifier of the anti-tarnish composition may be a nonionic emulsifier (such as polysorbate 80, polysorbate 20, glycerol monostearate, a polyethylene glycol derivative (such as sold as TRITON X-100 under the brand name TRITON), or the like). In a preferred aspect of the invention, the emulsifier of the anti-tarnish composition comprises polysorbate 80 (which may also serve partially as a surfactant).

Optionally, but in a preferred aspect of the invention, some components of the anti-tarnish composition are first mixed with a diluent before being introduced into the water of the ultrasonic bath 12 or before being packaged for consumer sales. The diluent may be a liquid such as water or a low molecular weight organic compound such as methyl alcohol, ethyl alcohol, propyl alcohol, or the like. The diluent may optionally be a mixture of the water and the low molecular weight organic compound or may be the organic compound mixed with a rheological dilatant fluid to carry the alkanethiol molecules as they shift and relocate along the metallic surface. In a preferred aspect of the invention, the diluent comprises propanol 91%.

In an aspect of the invention, the extra layer remover is a carboxylic acid or a salt thereof. In another aspect, the extra layer remover is tartaric acid or a salt thereof. In one aspect of the invention, the extra layer remover is a salt of tartaric acid, such as the potassium salt of tartaric acid, potassium tartrate. In a preferred aspect, the extra layer remover is tartaric acid, which is included in the inventive anti-tarnish composition in an amount greater than has been suggested before in the literature or in manufacturing methods (where tartaric acid has been used along with other acids or used for other purposes, such as to adjust pH). Many acids were experimentally tested, including citric acid, oxalic acid, and acetic acid. The other acids displayed various degrees of absorption or de-absorption, and can be used in the alkanethiol composition, but most preferably tartaric acid is used in the alkanethiol composition to remove extra layers. Optionally, other acids can be added to achieve additional purposes. For example, citric acid with its three acid groups can be added to the aqueous alkanethiol solution 10 when etching is needed.

Tartaric acid is preferred because it provides several advantages. One beneficial effect is that it is a weak acid that can dissolve chemicals that are weakly bonded to the silver surface (such as the emulsifier and/or anti-microbial agent and/or grease or the like) into the water of the aqueous alkanethiol solution 10. Because the tartaric acid serves to disassociate any non-alkanethiol chemicals that may be loosely bound to the metal surface, it unblocks the metal surface to allow the alkanethiol molecules within the aqueous alkanethiol solution 10 to reach the silver surface and to form a bond and/or a more uniform monomolecular layer. Advantageously, the tartaric acid cannot dissolve these alkanethiol-to-silver chemical bonds because these bonds are strong, so the tartaric acid does not remove the alkanethiol from the silver surface. Also, if there is a silver oxide layer, the tartaric acid can also remove it before the monomolecular layer forms.

Additionally, as previously discussed, tartaric acid can disassociate any additional layers (or clusters) of alkanethiol molecules that are weakly bonded above the base monomolecular layer of alkanethiol. Thus, the addition of the tartaric acid in the ranges provided removes any extra layers, which results in a single, monomolecular layer of alkanethiol. When the extra layers are not removed, silver sulfate is formed in the extra layers and in any clusters of alkanethiol, which appears to the viewer as dark tarnish or discoloration.

Yet another advantage of the tartaric acid is that the tartaric acid is a good emulsifier for the alkanethiol in the aqueous alkanethiol solution 10.

Tartaric acid was tested at various concentrations. Concentrations of tartaric acid at or above 2% provide an advantage. In an aspect of the invention, the concentration of tartaric acid is above 2%. In another aspect of the invention, the concentration of tartaric acid is above 4%. In an aspect of the invention, the concentration of tartaric acid is above 6%. In a preferred embodiment, the concentration is between 6% and 10%, which provides an improved, even, monomolecular layer. In one preferred embodiment 8% tartaric acid is used.

In an embodiment the general formulation for the anti-tarnish composition comprises the following (in percent by weight):

Alkanethiol'=0.1 to 5%;

Emulsifier=0.1 to 5%;

Alcohol=3 to 35%;

Water (preferably deionized)=1 to 95%; and

Extra layer remover=1 to 20%.

In another embodiment the general formulation for the anti-tarnish composition comprises the following (in percent by weight):

Hexadecanethiol and/or octadecanethiol=0.1 to 1%;

Polysorbate 80=0.1 to 1%;

Didecyl dimethyl ammonium bicarbonate and/or didecyl dimethyl ammonium carbonate (such as sold under the brand name of Carboshield 1000)=0.1 to 1%; Alcohol (preferably propanol 91%, which is a solution of 91% alcohol and 9% water)=4 to 12%;

Water (preferably deionized)=1 to 95%; and

Tartaric acid or a salt thereof=4 to 12%.

In a further embodiment the general formulation for the anti-tarnish composition comprises the following (in percent by weight):

Hexadecanethiol and/or octadecanethiol=0.3 to 0.5%;

Polysorbate 80=0.3 to 0.5%;

Didecyl dimethyl ammonium bicarbonate and/or didecyl dimethyl ammonium carbonate (such as sold under the brand name of Carboshield 1000)=0.3 to 0.7%;

Alcohol (preferably propanol 91%)=6 to 10%;

Water (preferably deionized)=1 to 95%; and

Tartaric acid or a salt thereof=6 to 10%.

In a preferred embodiment the general formulation for the anti-tarnish composition mixed comprises the following (in percent by weight):

Hexadecanethiol=0.3 to 0.5%;

Polysorbate 80=0.3 to 0.5%;

Didecyl dimethyl ammonium bicarbonate and/or didecyl dimethyl ammonium carbonate (such as sold under the brand name of Carboshield 1000)=0.3 to 0.7%;

Propanol 91%=6 to 10%;

Water (preferably deionized)=75 to 90%; and

Tartaric acid=over 6%; or optionally, 6% to 10%; or optionally 8%.

In a solution/bath preparation method of the invention, such as may be used in the coining industry, an aqueous alkanethiol solution 10 is formulated as disclosed in the above general formulations and is introduced into an ultrasonic bath 12 in preparation for receiving the article or articles to be treated.

The steps of the solution/bath preparation method comprise the following:

a) Begin to prepare the ultrasonic bath by placing water (preferably deionized water) into the tank 13 of an ultrasonic bath 12.

b) Heat the water in the ultrasonic bath 12 to 35° C. to 65° C.

c) Add the extra layer remover to the water.

d) Activate the ultrasonic wave generator(s) 15 of the ultrasonic bath 12 to dissolve the extra layer remover into the water.

e) Wait until the extra layer remover is completely dissolved in the water.

f) In a separate container, such as a measuring tube, heat a diluent to 35° C. to 65°, such as by immersing the separate container in a warm water cup.

g) Add the emulsifier into the diluent and stir, such as with a glass bar.

h) Add any anti-microbial agent into the diluent and stir.

i) Add the alkanethiol into the diluent and stir until all chemicals are dissolved to create an alkanethiol/diluent mixture.

j) Activate the ultrasonic generator(s) 15 of the ultrasonic bath 12 to begin to produce ultrasonic waves.

k) Pour the alkanethiol/diluent mixture into the water of the tank 13 of the ultrasonic bath 12. The generation of high-frequency waves within the water by the ultrasonic wave generator(s) 15 results in emulsification of the alkanethiol/diluent mixture into the water of the tank 13 and may result in some foaming.

l) Maintain the generation of the ultrasound waves while stirring until any foaming disappears and the aqueous alkanethiol solution 10 formed within the tank 13 has a uniform appearance.

In a preferred embodiment of the invention, the steps of the solution/bath preparation method comprise the following:

a. Begin to prepare the ultrasonic bath by placing water (preferably deionized water) into the tank 13 of an ultrasonic bath 12.

b. Heat the water in the ultrasonic bath 12 to 45° C. to 55° C.

c. Add tartaric acid or a salt thereof as an extra layer remover into the water.

d. Activate the ultrasonic wave generator(s) 15 of the ultrasonic bath 12 to dissolve the extra layer remover into the water.

e. Wait until the extra layer remover is completely dissolved in the water.

f. In a separate container, such as a measuring tube, heat the alcohol to 45° C. to 55° C., such as by immersing the separate container in a warm water cup.

g. Add the emulsifier into the alcohol and stir.

h. Add the anti-microbial agent into the alcohol and stir.

i. Add the alkanethiol into the alcohol and stir until all chemicals are dissolved to create an alkanethiol/alcohol mixture.

j. Activate the ultrasonic generator(s) 15 of the ultrasonic bath 12 to begin to produce ultrasonic waves.

k. Pour the alkanethiol/alcohol solution into the water within the tank 13 of the ultrasonic bath 12. The generation of high-frequency waves within the water by the ultrasonic wave generator(s) 15 results in emulsification of the alkanethiol/alcohol mixture into the water of the tank 13 and may result in some foaming.

l. Maintain the generation of the ultrasound waves while stirring until any foaming disappears and the aqueous alkanethiol solution 10 formed within the tank 13 has a uniform appearance.

In one embodiment of the invention, the ultrasonic bath 12 is equipped with one ultrasonic wave generator 15 that produces ultrasonic waves of a first frequency, which may be, for example, in the range of about 25 to 60 kHz. The ultrasonic bath 12 is typically sold as an ultrasonic cleaner with a heater and with a digital timer that can be set to establish the length of time for which the ultrasonic wave generator 15 will be active. The ultrasonic bath 12 transforms low-frequency AC current into high-frequency sound waves, typically by using a piezoelectric transducer to create sinusoidal waves. These high frequency ultrasonic wave vibrations create microscopic spherical bubbles that implode violently causing cavitation by the formation and violent collapse of minute vacuum bubbles in the solution. These implosions are not overly harsh yet apply energy to every surface with which the solution makes contact, which improves the attachment of the alkanethiol to the surface and the evenness of the layer created.

In another embodiment of the invention, the ultrasonic bath 12 is equipped with a sweep-frequency circuit. In this embodiment, the ultrasonic generator 15 produces ultrasonic waves of a first frequency, which may be in the range of about 25 to 60 kHz, but it additionally sweeps the output frequency to the transducers by around 2-3 kHz to eliminate areas of inactivity between neighboring standing waves. The sweep frequency provides creates overlapping ultrasonic waves.

In a further embodiment of the invention, the ultrasonic bath 12 is equipped with two sweep-frequency ultrasonic generators 15, 17 that produce ultrasonic waves of a first output frequency and a second output frequency, and that also sweep one or both output frequencies by around 2-3 kHz.

In a preferred embodiment of the invention, the ultrasonic bath 12 is a two-directional two-frequency bath equipped with two ultrasonic wave generators 15, 17 that produce ultrasonic waves of a first frequency and of a second frequency, with both frequencies being in the range of about 25 to 60 kHz. In an example, one ultrasonic wave generator 15 may be disposed at the bottom of the ultrasonic bath tank 13, and one ultrasonic wave generator 17 may be disposed at the sidewall of the tank 13. In an aspect of the invention, the first generator 15 is a 200-Watt 40-kHz ultrasonic generator located under the tank, and the second generator 17 is a 200-Watt 20-kHz ultrasonic generator disposed adjacent to the sidewall of the tank 13.

Upon activation of both generators 15, 17, it was found that the generated cavitation bubbles were not spheres, but were instead elliptical balls, due to the different angles and/or frequencies provided by the two generators 15, 17. When an elliptical ball collapsed, the area of the pressure impacted was enlarged and the pressure was relatively uniform. The pressure spikes generated by the cavitation bubble collapse were blunted. For collectible coins, jewelry, or museum artifacts, this pressure modification is important. Any possible residual impact scars must be avoided. The two-directional (and, optionally, two-frequency) ultrasonic bath provides an excellent working environment to increase the chemical reaction rate but does not damage the initial surface feature. The processing time to completely apply a layer to cover the solid surface was reduced from a few days to one to a few minutes. In one aspect of the invention the ultrasonic bath time is under 10 minutes. In another aspect, the ultrasonic bath time is under 7 minutes. In a further aspect, the ultrasonic bath time is under 5 minutes. In an additional aspect, the ultrasonic bath time is under 2 minutes. In one aspect, the ultrasonic bath time is up to 1 minute.

Preferably, the temperature of the aqueous alkanethiol solution 10 in the tank is controlled between 35 and 55° C. Most preferably, the temperature of the aqueous alkanethiol solution 10 in the tank is controlled between 45 and 50° C.

Preferably, the coin or metal object 20 is directly immersed in the developed solution without a precleaning cycle in the ultrasonic bath. This is preferred because any cleaning process could damage the details on the object or coin.

When treating multiple coins or other articles 210 with a metal surface, they may be treated sequentially or simultaneously. In an aspect in which coins are being treated at a manufacturing plant, multiple coins may be supported within the tank 13 for treatment simultaneously to accommodate manufacturing time frames. In other aspects, such as the home ultrasonic cleaner containing the inventive aqueous alkanethiol solution 10, jewelry pieces may be treated alone or in groups.

After immersion in the aqueous alkanethiol solution 10, the coins or articles 20 are rinsed with water (preferably distilled). Preferably they are then sprayed to remove residual solution. Then they are air dried and/or they may be towel dried.

When the alkanethiol monomolecular layer is applied to the metal surface or coin blanks by burnishing, the standard burnishing process is used with the substitution of the inventive aqueous alkanethiol solution 10 for the standard burnishing aqueous solution. The coin blanks to be treated, the inventive aqueous alkanethiol solution 10 (which is diluted with water at a water to solution ratio of at least 10 parts water to 1 part solution), and stainless-steel balls are placed into the bowl/tank of a burnishing machine. A rotor at the bottom of the bowl/tank provides the mechanical agitation necessary to move the stainless-steel balls and coin blanks. The chemicals of the alkanethiol composition within the aqueous alkanethiol solution 10 react with the metal surfaces 25 when the countless balls slide on the blanks.

In an exemplary burnishing method, around 500 to 1000 one-ounce silver blanks are immersed in the inventive aqueous alkanethiol solution 10 formed from about 300 to 500 ml of the anti-tarnish alkanethiol composition (preferably mixed with the diluent at the ratio of least 10 parts diluent to 1 part alkanethiol solution). The blanks are burnished and treated for about 2 to 5 minutes at 35-45 C. Then the blanks are rinsed for about 2 to 5 minutes. Finally, the blanks are towel dried using the standard Spaleck system.

The amount of anti-tarnish alkanethiol composition needed per burnishing tank varies depending on the material, so a burnishing test and an accelerated sulfurization test should be performed to determine the best amount of anti-tarnish alkanethiol composition to be mixed into the water of the burnishing tank. The reaction rate is faster in the burnishing method than in the ultrasonic bath, so the concentration of the anti-tarnish composition in the burnishing tank can be lower than the concentration in the ultrasonic bath.

When the alkanethiol monomolecular layer is used in a home or restoration business, the user will likely not want to proceed through the steps of the solution/bath preparation method disclosed above. In this case, the inventive aqueous alkanethiol solution 10 can be prepared at the manufacturer and sold in containers (such as one-gallon, two-gallon, or five-gallon jugs or the like). In another aspect of the invention, the components of the anti-tarnish composition may be sold in a concentrated formula with instructions for the user to mix with water in a home or business ultrasonic bath to create the inventive aqueous alkanethiol solution 10 to be used in the home or business ultrasonic bath. In another aspect of the invention, the components of the anti-tarnish composition may be sold partially pre-mixed with additional water to be added to this concentrate by the user. In a further aspect of the invention, the components of the anti-tarnish composition may be sold in a kit of multiple containers with preparation instructions provided to the user for mixing with water to create the developed aqueous alkanethiol solution 10 to be used in the home or business ultrasonic bath.

The process of applying the alkanethiol to the surface of the metallic object is a dynamic coating process in which the article to be treated is introduced into the aqueous alkanethiol solution 10 and a well-ordered alkanethiol monomolecular layer is formed on the surface. The alkanethiol application method may be varied slightly depending on the device into which the article 20 to be treated is placed for treatment, since the aqueous alkanethiol solution 10 can be used in the large ultrasonic bath 12 of the coining industry, a more modestly sized home ultrasonic cleaner (such as is sold for cleaning jewelry), or in a commercial burnishing cylindrical container.

In this dynamic coating process, continually and simultaneously, some molecules from the aqueous alkanethiol solution 10 are absorbed onto the metal surface while other molecules are de-absorbed from the surface. Although in some conventional processes for applying a thiol layer to the surface of metal, the thickness of the layers of molecules increased with time or increased with an increase of alkanethiol in the solution, when using tartaric acid in the specified range disclosed herein, the alkanethiol layer thickness remains the same, even when the concentration of alkanethiol is increased in the solution 10 or when the length of the bath time is increased. This leads to better results in both commercial and consumer usage.

When using the anti-tarnish composition and methods provided herein, a manufacturer or restorer may need to confirm, ensure, or prove that the self-assembled monomolecular layer is present and is protecting the metal surface 25. Though an environmental test can be performed in which the $H_2S$ in the air is allowed to react with the silver to form silver sulfide, this can require months or years to see the results. To avoid waiting, an accelerated sulfurization system may be used in which the article 20 is exposed to a higher concentration of sulfur for a shorter time than in the environmental test in which the article is exposed to a normal atmospheric environment over a long time period.

For example, in a mint or coin manufacturing facility, a production line moves quickly, so it is not possible to use a sophisticated instrument to measure the deposited alkanethiol layer in the short time frame of the production line. Therefore, an accelerated sulfurization system may be used to speed up the exposure to sulfur to provide test results. This will then allow the color and reflectivity of the coins to be used to evaluate the anti-tarnish properties of the self-assembled alkanethiol monomolecular layer in a short time frame.

Figure 2:
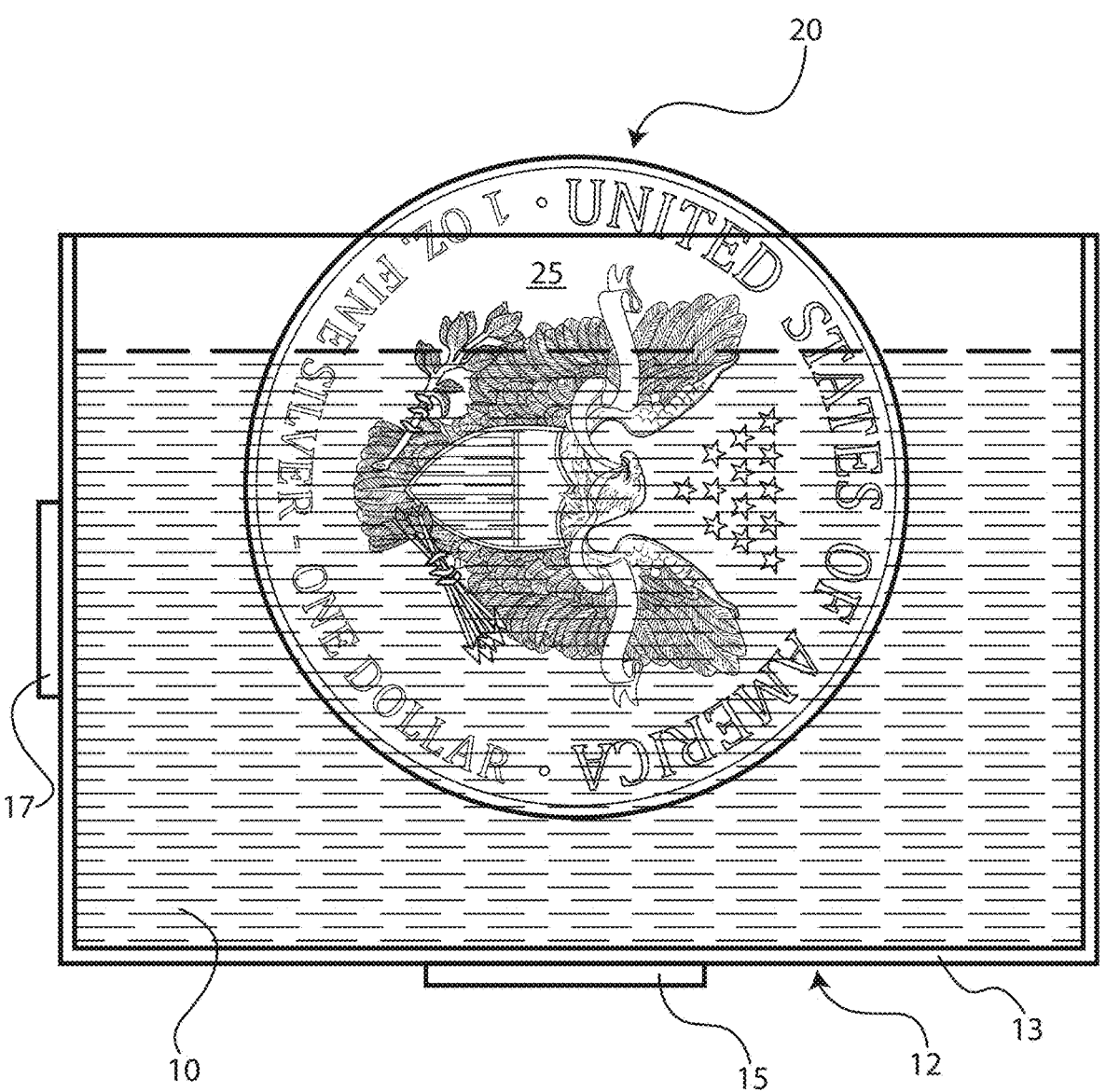
FIG. 2 is a schematic of an ultrasonic water bath, wave generators, and an anti-tarnish fluidic alkanethiol solution, schematically showing a 1993 US Mint Walking Liberty coin (not to scale) during deposition of an alkanethiol monomolecular layer of the present invention on a portion of the surface of the coin.
Figure 3:
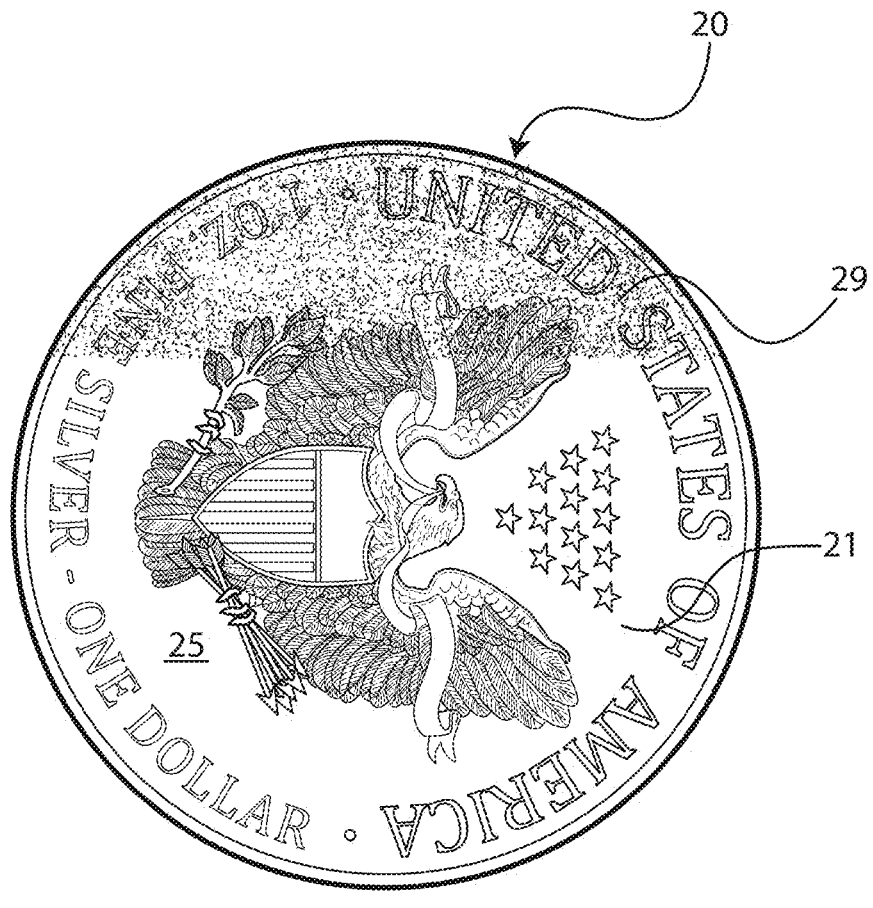
FIG. 3 is a top view of a reverse side of the 1993 US Mint Walking Liberty coin treated as shown in FIG. 2, which is illustrated after an accelerated sulfurization test, which shows tarnish only on the portion of the coin that was not treated with the alkanethiol monolayer film coating of the present invention.

Tests have been conducted to assure that the anti-tarnish composition and the methods of application using the aqueous alkanethiol solution 10 produce an alkanethiol monomolecular layer that is deposited in a single well-ordered layer and that forms an intact tarnish-resistant layer. In one test shown in FIGS. 1-3, a 1993 US Mint Walking Liberty coin was used. FIG. 1 shows the 1993 US Mint Walking Liberty coin that has been stored in a protected environment and is relatively untarnished. FIG. 2 illustrates schematically (not to scale) that the coin is then partially suspended in the developed alkanethiol solution 10 so that only a portion is treated (in the illustrated test, the portion treated is over half of the surface of the coin). After treatment, the coin is rinsed with distilled water and air dried. No visible or measurable changes in reflectivity or color were seen on the treated portion of the surface. The coin was then placed in an accelerated sulfurization chamber for one hour, which equates to being exposed in the ambient atmosphere for several years. The result of the test is shown in FIG. 3 in which the treated portion of the coin remained in the original condition and the uncoated area on the coin reacted with the $H_2S$ in the accelerated sulfurization system and turned brown and dark blue with tarnish.

Figure 4:
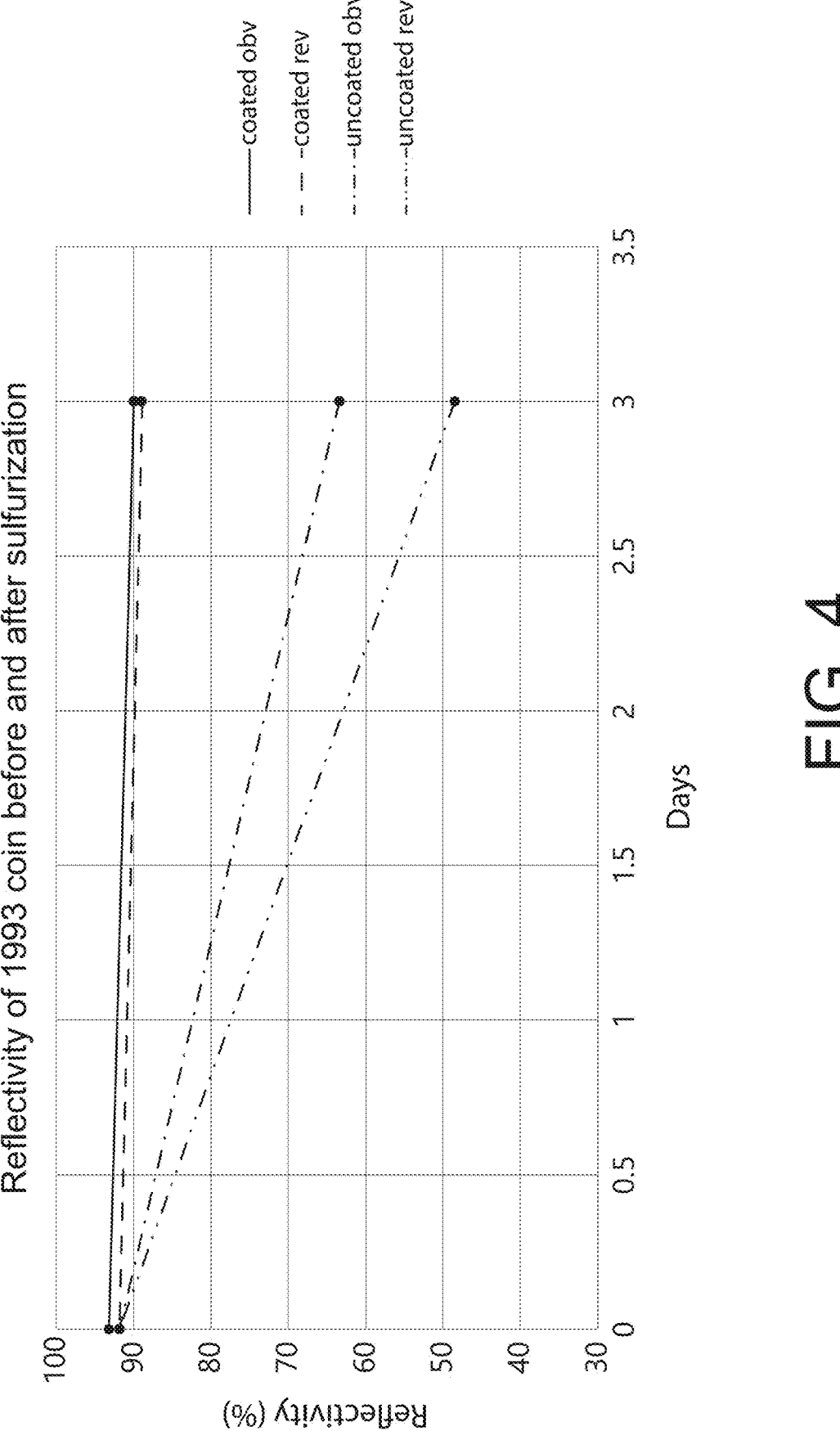
FIG. 4 is a graph showing measured reflectivity test results comparing the uncoated/untreated reverse and obverse sides of a 2022 Sunshine Mint Route 66 silver round to the reverse and obverse sides of a 2022 Sunshine Mint Route 66 silver round that has been treated with the anti-tarnish composition of the present invention to form an alkanethiol monomolecular layer on the coin surface.

The results of the three-day sulfurization test are shown graphically in FIG. 4. (In this case the sulfurization test used $H_2S$ released from vegetables, although other accelerated sulfurization tests can be used and are within the scope of the invention.) The reflectivity was measured in the coated and uncoated areas of the 1993 US Mint Walking Liberty silver coin. For the coated area of the surface, after three days, the average reflectivity dropped from around 92% to around 89%. For the uncoated surface area, the reflectivity dropped to around 50-60%. The results prove that the monomolecular layer applied by the composition and methods of the invention can protect an unpolished surface of a coin and prove that the coin need not be freshly minted for the alkanethiol application. Therefore, for collectors who prefer that the surface be slightly sulfurized, the coin can be held at this favored coloration, and the sulfurization that would further tarnish the coin can be inhibited.

Figure 6:
FIG. 6 is a graph showing measured reflectivity test results for a variety of coins exposed to a sulfurization test, including, for comparison, a Route 66 Round treated with the anti-tarnish composition of the present invention.

The results of another test are shown in FIG. 6. In this test, the alkanethiol was applied to one 2022 Sunshine Mint Route 66 silver round. The blank for this Route 66 silver round was burnished with the inventive alkanethiol solution 10 before stamping and was ultrasonically bathed in the solution 10 for 1.5 minutes after stamping. This treated coin was compared to seven 1-ounce silver coins from around the world. The eight coins were placed in the accelerated sulfurization system to evaluate the anti-tarnish properties of the applied alkanethiol layer. At the start, the color and reflectivity were similar among the coins. Though some coins had frosted surfaces and some had polished surfaces, the reflectivity was similar; the initial reflectivity was in the range of from 92% to 96%.

After only a one-hour accelerated sulfurization test, all the coins had changed color except for the Route 66 silver round. The details of the processes or chemical treatments of the various mints that produced the seven comparison coins are not known, but the results of the sulfurization test varied between the coins. The Britannia coin made by the Royal Mint showed it had the worst anti-tarnish protection. The reflectivity of the Route 66 silver round did not change at all. Therefore, the use of the inventive anti-tarnish composition and methods by coin manufacturers will preserve the initial reflectivity and color, thereby reducing or eliminating customer complaints about tarnishing issues.

After the sulfurization test, small water drops condensed on the coin surfaces. The water drops later evaporated but some drops left watermarks on the coin surface. However, no watermark was found on the Route 66 silver round, due to its low surface tension property.

Figures 7A, 7B:
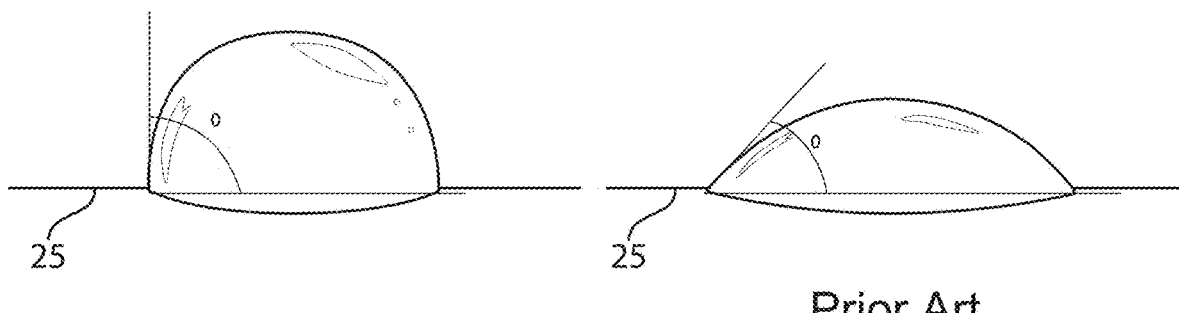
FIG. 7A is a schematic illustrating the surface contact angle of a water droplet on a metallic surface that has been treated with the anti-tarnish composition of the present invention, which can be compared to FIG. 7B.
FIG. 7B is a schematic illustrating the surface contact angle of a water droplet on a standard untreated metallic surface of the prior art, which is shown for comparison to the water droplet on the metallic surface of FIG. 7A.

Another test that can show that the anti-tarnish alkanethiol monomolecular layer is protecting the silver surface 25 is a test of the surface contact angle of a water droplet, as shown in FIGS. 7A and 7B. The treated Route 66 silver round is shown in FIG. 7A and the surface 25 of the Royal Mint Britannia coin is shown in FIG. 7B. The surface contact angle of the Route 66 coin was measured at 90.1 degrees, which was the highest contact angle measured of the coins compared in FIG. 6. The lowest surface contact angle was measured on the Royal Mint Britannia, which was 52.9 degrees. This shows that the anti-tarnish alkanethiol monomolecular layer has been deposited, which changed the wettability of the surface. The values of the contact angles also correlate to the appearance of water spots on the coin surfaces after the sulfurization test. The Route 66 coin had no water spots.

Tests have also shown that the alkanethiol monomolecular layer provides a lubricant effect and lowers the coefficient of friction between the dies and the blanks during production. Thus, the inventive alkanethiol monomolecular layer increases die life and the coin surface quality.

Gold articles and coins can also benefit from the application of the alkanethiol monomolecular layer onto the gold surface, both through reduction or elimination of red tarnish spots and through increasing the smoothness of the gold surface during stamping. Gold articles and coins can appear tarnished from the random red spots found on the surface caused by silver sulfide. Though a process of etching the gold surface with nitric acid for a relatively long time is known to reduce gold tarnishing, the inventive composition and process herein disclosed can be accomplished in a shorter amount of time and with less damage to the surface.

In a test, twenty-four gold bars were ultrasonically bathed in the alkanethiol solution 10 disclosed above for 5 minutes. Then the bars were rinsed in 50 C deionized water and towel dried. The bars were then directly struck on the press. Two phenomena were observed.

Firstly, the die surfaces of these treated bars were not blackened during the stamping. The clean die surface indicated that the alkanethiol monomolecular layer on the blank surface was a well-ordered monomolecular layer with substantially no extra alkanethiol molecules to accumulate on the die surfaces strike after strike.

Figure 5A:
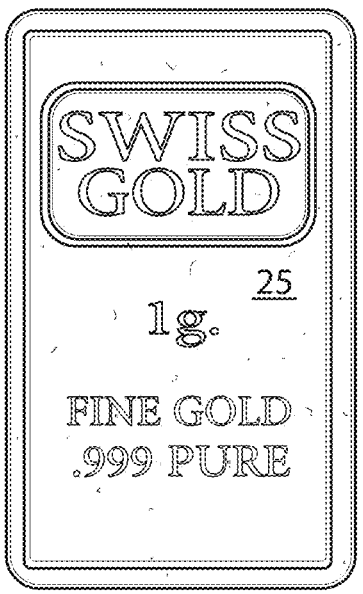
FIG. 5A is a representation of a gold bar formed from a gold blank ultrasonically bathed in the anti-tarnish composition of the present invention showing a smoother surface than the un-treated gold bar of FIG. 5B.
Figure 5B:
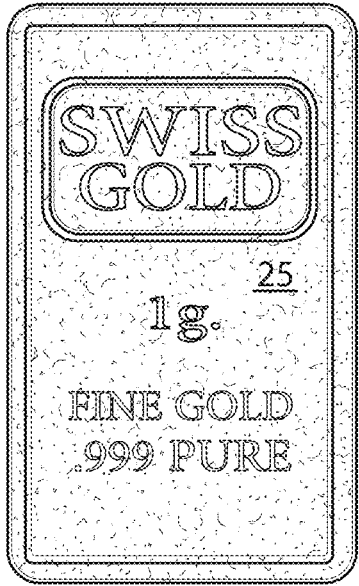
FIG. 5B is a representation of a gold bar formed from a standard gold blank (without application of the anti-tarnish composition of the present invention).

Secondly, the surface morphology was improved due to the low friction. While silver is a solid lubricant (so the stamped coin image appears substantially the same with or without the alkanethiol monomolecular layer between the coin surface and the die), gold is not a solid lubricant. With the alkanethiol monomolecular layer applied to the gold surface, the friction was lower. This lower friction caused a smoother stamped surface. A comparison of the whole gold bar with and without the alkanethiol monomolecular layer is show in FIGS. 5A and 5B. The inventive alkanethiol monomolecular layer was applied to the gold bar shown in FIG. 5A before stamping. The comparison gold bar without the alkanethiol monomolecular layer is shown in FIG. 5B. Most fine scratches were plastically smoothed on the surface of the treated gold bar, thus resulting in an improved surface over the standard gold bar of FIG. 5B.

Tests were also performed on gold bars that were tarnished. The inventive application of the alkanethiol monomolecular layer onto the tarnished gold bars caused the red tarnish spots to disappear. Additionally, the red spots did not reappear after an accelerated sulfurization test. This indicates that the inventive anti-tarnish composition and methods may be used for gold product lines to replace the nitric etching and to improve the surface smoothness.

The addition of the extra layer remover to the aqueous alkanethiol solution 10 and the utilization of the ultrasonic bath (or the burnishing process) removes the extra physically adsorbed layers of alkanethiol and only a reacted monomolecular layer remains on the metal surface. The composition and methods of treatment presented herein produce a thin and even monomolecular layer. If the thiol layer is not very thin and very even, upon exposure to air for a few months, some very small black dots will appear. Analyzing the small black dots with a scanning electron microscopy, the sulfur concentration at the dot locations was observed to be high. The black dots were silver sulfate formed by multiple layers of alkanethiol on the surface 25, in contrast to the single layer of alkanethiol applied in the current invention. Thus, the inclusion of the effective extra layer remover (preferably tartaric acid in the ranges provided) is desirable. Not wishing to be bound by theory, it is believed that the extra layer remover functions as a soap and opens the bonds between the physical adsorptions, such as the Van der Waals force, but it cannot open the bonds of the chemical reaction products. For example, when using hexadecanethiol, the bonding energy between hexadecane molecules differs from the bonding energy between S and Ag in $Ag_2S$ by at least a factor of ten. The tartaric acid can open the bond between the hexadecanethiol molecules but cannot open the bond between the Ag and S. Therefore, with the inventive concentration of the tartaric acid in the solution, the extra layers of the hexadecane molecules are dissolved in the water, and only one layer of the hexadecane thiol molecules react with Ag and stay on the silver surface. In Fourier transform infrared (FTIR) spectrum measurement, the monomolecular layer was demonstrated to be a single layer. The absorption peak intensity was around 0.09 to 0.16, (at 2800 $1/cm^{-1}$) for a molecule with 16-18 carbon atom hydrocarbon chain, which signifies a mono-hexadecane molecular layer on the surface.

The anti-tarnish composition of the present invention can be used to create an aqueous alkanethiol solution into which an article 20 with a metal surface 25 can be immersed to deposit an even alkanethiol monomolecular layer on the surface 25 to provide anti-tarnish and/or lubrication properties. The time frame for the application is short enough to be used in coin fabrication facilities. The anti-tarnish treatment may be used before, after, or before and after creation of the metallic article.

Advantageously, the water-soluble anti-tarnish composition of the present invention is non-toxic and safe to use. Over 99% of the materials in the composition are drinkable. The solution is not volatile, and no special ventilation is needed when used in a home or at a manufacturing facility. However, preferably the solution contains a very low level of alcohol, which must be taken into consideration. The solution does not require special disposal efforts, but due to its non-toxic nature, it can be disposed of easily and safely.

For burnishing, the low concentration is further diluted through the addition of over ten times the water volume to the volume of the aqueous solution 10 that is used, so the solution has a particularly low concentration. This allows the effluent to be dried (evaporated) and allows the remaining solids to be safely disposed of in a landfill.

In the ultrasonic bath method, since the quantity is low, similarly, the effluent can be dried first (evaporated), and then solids can be disposed safely in a landfill.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An alkanethiol solution, comprising:
   an alkanethiol for forming, when an article to be treated is exposed to the alkanethiol solution, a well-ordered alkanethiol monolayer on a metallic surface of the article;
   an emulsifier;
   a tartaric acid or salt thereof in an amount that is effective to remove extra molecules of the alkanethiol beyond a base layer of alkanethiol; and
   water into which the alkanethiol, the emulsifier, and the tartaric acid or salt thereof are mixed.

2. The alkanethiol solution, as recited in claim 1, wherein:
   the alkanethiol is present in the alkanethiol solution in a percentage by weight of from 0.1% to 5%;
   the emulsifier is present in the alkanethiol solution in a percentage by weight of from 0.1% to 5%; and
   the tartaric acid or salt is present in the alkanethiol solution in a percentage by weight of from 4% to 12%.

3. The alkanethiol solution, as recited in claim 2, wherein:
   the alkanethiol solution further comprises alcohol that is present in the alkanethiol solution in a percentage by weight of from 6% to 10%;
   the metallic surface consists of a silver surface or a gold surface;

the alkanethiol consists of hexadecanethiol, octadecanethiol, or a mixture of the hexadecanethiol and the octadecanethiol; and the emulsifier consists of one or more of the following: polysorbate 80, polysorbate 20, glycerol monostearate, and a polyethylene glycol derivative.

4. The alkanethiol solution, as recited in claim 1, wherein:

the alkanethiol is present in the alkanethiol solution in a percentage by weight of from 0.1% to 0.5%;

the alkanethiol consists of hexadecanethiol, octadecanethiol, or a mixture of the hexadecanethiol and the octadecanethiol;

the emulsifier is present in the alkanethiol solution in a percentage by weight of from 0.1% to 0.5%;

the emulsifier consists of one or more of the following: polysorbate 80, polysorbate 20,glycerol monostearate, and a polyethylene glycol derivative; and the tartaric acid or salt is present in the alkanethiol solution in a percentage by weight of from 4% to 12%.

5. The alkanethiol solution, as recited in claim 1, wherein the alkanethiol consists of hexadecanethiol, octadecanethiol, or a mixture of the hexadecanethiol and the octadecanethiol.

6. The alkanethiol solution, as recited in claim 1, wherein the metallic surface consists of a silver surface or a gold surface.

7. The alkanethiol solution, as recited in claim 1, wherein the tartaric acid or salt thereof is present in the alkanethiol solution in a percentage by weight of more than 6%.

8. The alkanethiol solution, as recited in claim 1, wherein the tartaric acid or salt thereof is present in the alkanethiol solution in a percentage by weight of from 6% to 10%.

9. The alkanethiol solution, as recited in claim 1, wherein the tartaric acid or salt thereof is present in the alkanethiol solution in a percentage by weight of about 8%.

10. The alkanethiol solution, as recited in claim 1, wherein the emulsifier consists of one or more of the following: polysorbate 80, polysorbate 20, glycerol monostearate, and a polyethylene glycol derivative.

11. The alkanethiol solution, as recited in claim 1, wherein the alkanethiol solution further comprises an anti-microbial agent comprising at least one of the following: didecyl dimethyl ammonium bicarbonate or didecyl dimethyl ammonium carbonate.

12. The alkanethiol solution, as recited in claim 1, wherein the alkanethiol solution further comprises alcohol that is present in the alkanethiol solution in a percentage by weight of from 6% to 10%.

13. The alkanethiol solution, as recited in claim 1, wherein the tartaric acid or salt thereof additionally functions as an emulsifier for the alkanethiol in the water.

14. The alkanethiol solution, as recited in claim 1, wherein the tartaric acid or salt thereof is additionally effective to dissolve non-alkanethiol chemicals loosely bonded to the metallic surface, thereby unblocking the metallic surface to allow alkanethiol molecules to reach the metallic surface and to form the well-ordered alkanethiol monolayer.

15. The alkanethiol solution, as recited in claim 1, wherein, when the alkanethiol solution is applied to the metallic surface of the article, the alkanethiol solution deposits the well-ordered alkanethiol monolayer, the well-ordered alkanethiol monolayer having a thickness of under 100 nanometers.

16. The alkanethiol solution, as recited in claim 15, wherein the well-ordered alkanethiol monolayer has a thickness of 40 to 60 nanometers.

17. The alkanethiol solution, as recited in claim 1, wherein, when the alkanethiol solution is applied to the metallic surface, a thickness of the well-ordered alkanethiol monolayer deposited on the metallic surface remains constant regardless of increases in a concentration of the alkanethiol in the alkanethiol solution or increases in a duration of exposure of the metallic surface to the alkanethiol solution.

18. An alkanethiol solution, comprising:

an alkanethiol having the general formula R—SH, where SH is a sulfhydryl group and where R is an alkyl radical having from ten through twenty carbon atoms, the alkanethiol being present in a percentage by weight of from 0.1% to 1%;

polysorbate 80 as an emulsifier, present in a percentage by weight of from 0.1% to 1%;

tartaric acid present in a percentage by weight of from 4% to 12%, wherein the tartaric acid is in an amount that is effective to remove extra molecules of the alkanethiol beyond a base monomolecular layer of the alkanethiol on a silver surface or a gold surface;

an anti-microbial agent comprising at least one of the following: didecyl dimethyl ammonium bicarbonate or didecyl dimethyl ammonium carbonate, present in a percentage by weight of from 0.1% to 1%;

alcohol present in a percentage by weight of from 4% to 12%; and water into which the alkanethiol, the polysorbate 80, the tartaric acid, the anti-microbial agent, and the alcohol are mixed;

wherein, when the alkanethiol solution is applied to the silver surface or the gold surface, the alkanethiol solution deposits an alkanethiol monomolecular layer having a thickness of under 100 nanometers on the silver surface or the gold surface.

19. The alkanethiol solution, as recited in claim 18, wherein the alkanethiol consists of hexadecanethiol, octadecanethiol, or a mixture of the hexadecanethiol and the octadecanethiol.

20. The alkanethiol solution, as recited in claim 18, wherein the alkanethiol solution is at a temperature of from 35° C. to 65° C. when the silver surface or the gold surface is exposed to the alkanethiol solution.

21. The alkanethiol solution, as recited in claim 18, wherein the tartaric acid is present in a percentage by weight of from 6% to 10%.

22. The alkanethiol solution, as recited in claim 18, wherein, when the silver surface or the gold surface is exposed to the alkanethiol solution, the alkanethiol monomolecular layer is deposited in under ten minutes of exposure time.

23. The alkanethiol solution, as recited in claim 18, wherein, when the silver surface or the gold surface is exposed to the alkanethiol solution, the alkanethiol monomolecular layer is deposited in under five minutes of exposure time.

24. The alkanethiol solution, as recited in claim 18, wherein the alkanethiol monomolecular layer is characterized by a Fourier transform infrared (FT-IR) absorption peak intensity of approximately 0.09 to 0.16 at approximately 2800 cm$^{-1}$, indicative of a monomolecular layer of a 16 to 18 carbon atom hydrocarbon chain on the silver surface or the gold surface.

25. The alkanethiol solution, as recited in claim 18, wherein, when the alkanethiol solution is applied to the silver surface or the gold surface, the thickness of the alkanethiol monomolecular layer deposited on the silver surface or the gold surface remains constant regardless of increases in a concentration of the alkanethiol in the alkanethiol solution or increases in a duration of exposure of the silver surface or the gold surface to the alkanethiol solution.

26. The alkanethiol solution, as recited in claim 18, wherein:

the alkanethiol is present in a percentage by weight of from 0.3% to 0.5%;

the polysorbate 80 is present in a percentage by weight of from 0.3% to 0.5%;

the anti-microbial agent is present in a percentage by weight of from 0.3% to 0.7%;

the alcohol comprises propanol and is present in a percentage by weight of from 6% to 10%; and the tartaric acid is present in a percentage by weight of from 6% to 10%.

\* \* \* \* \*